April 6, 1948.                H. K. KRANTZ                2,438,925
         MAGNETOSTRICTIVE SUBMARINE SIGNAL TRANSMITTER OR RECEIVER
                    Filed Aug. 18, 1944          2 Sheets-Sheet 1

INVENTOR
BY   H. K. KRANTZ
    Walter C. Kiesel
            ATTORNEY

April 6, 1948.          H. K. KRANTZ              2,438,925
       MAGNETOSTRICTIVE SUBMARINE SIGNAL TRANSMITTER OR RECEIVER
              Filed Aug. 18, 1944        2 Sheets-Sheet 2
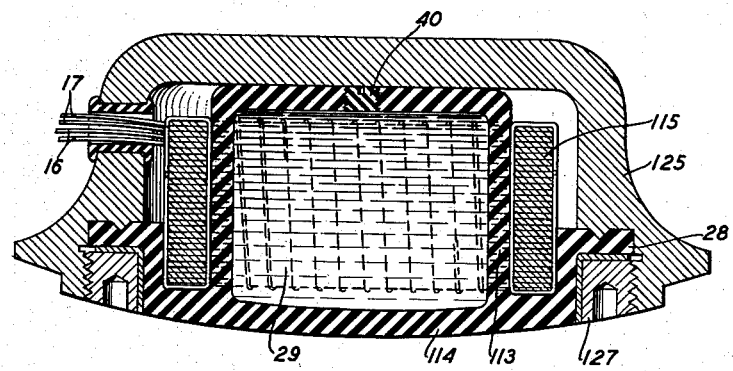
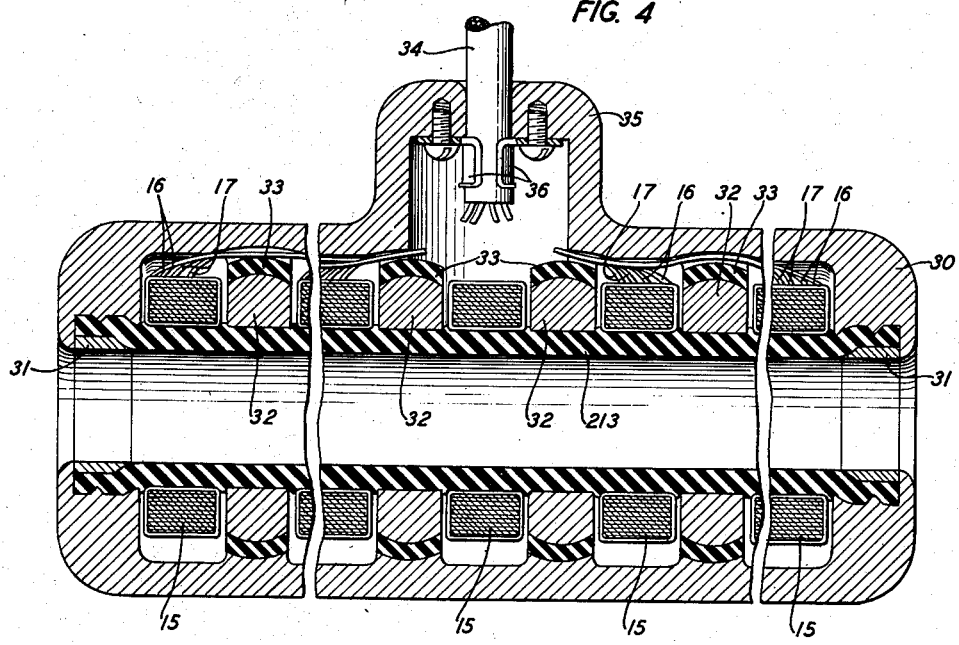
INVENTOR
H. K. KRANTZ
BY
Walter C. Kiesel
ATTORNEY Patented Apr. 6, 1948

2,438,925

UNITED STATES PATENT OFFICE 2,438,925

MAGNETOSTRICTIVE SUBMARINE SIGNAL TRANSMITTER OR RECEIVER

Hubert K. Krantz, Rockville Centre, N. Y., assignor to Bell Telephone Laboratories, Incorporated, New York, N. Y., a corporation of New York Application August 18, 1944, Serial No. 549,972

7 Claims. (Cl. 177—386)

1

This invention relates to magnetostrictive devices and more particularly to supersonic submarine signal receivers and projectors of the magnetostrictive type.

One general object of this invention is to improve the operating characteristics of magnetostrictive devices. More specific objects of this invention are to increase the conversion efficiency of electromechanical transducers of the magnetostrictive type and to simplify and improve the construction of supersonic submarine signaling devices.

In one illustrative embodiment of this invention, a submarine signaling device suitable for operation as either a receiver or projector comprises a magnetostrictive core, a signal coil in electromagnetic coupling relation therewith, and a compressional wave energy transmitting element in energy transferring relation with the core.

In accordance with one feature of this invention, the magnetostrictive core is annular in form and arranged to vibrate radially when energized and the wave energy transmitting element is so constructed and associated with the core that the radial vibrations of the core are converted into vibrations of the element in the direction normal to the core radii or, conversely, that vibrations of the element in the direction noted are translated into radial vibrations of the core.

In accordance with a more specific feature of this invention, the wave energy transmitting element comprises a body of a fluid, rubber, plastic, or the like, for example, having substantially the same characteristics as sea water for the transmission of supersonic compressional wave energy, which body is encompassed by the magnetostrictive core and is in intimate energy translating relation therewith.

The invention and the above noted and other features thereof will be understood more clearly and fully from the following detailed description with reference to the accompanying drawing in which:

Fig. 3 is an elevational view in section of a modification of the device illustrated in Figs. 1 and 2;

Fig. 4 is a side view in section of a submarine signaling device illustrative of another embodiment of the invention and comprising a plurality of radially vibratile magnetostrictive cores.

Figure 1:
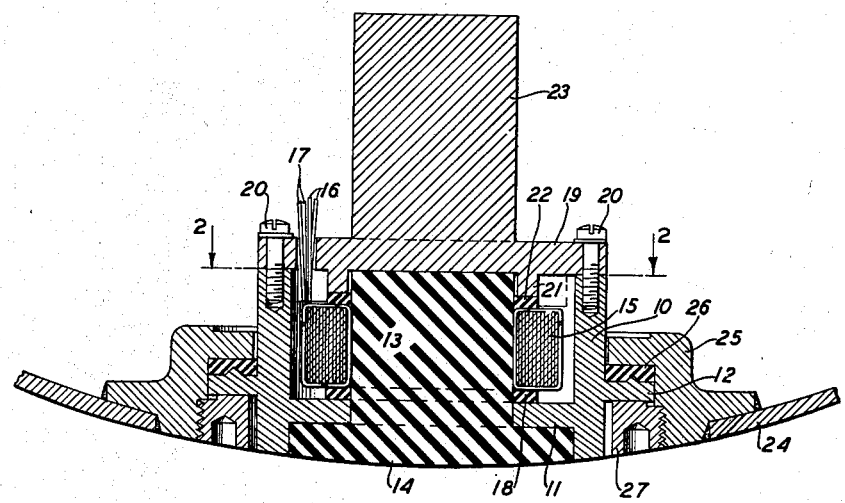
Fig. 1 is an elevational view in section of a submarine signaling device illustrative of one embodiment of this invention.
Figure 2:
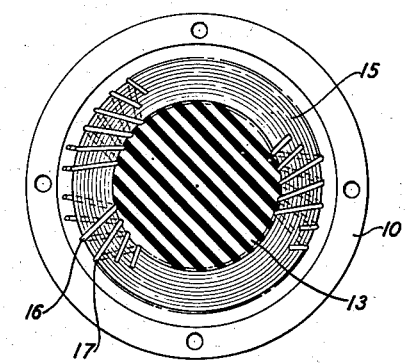
Fig. 2 is a view partly in section along plane 2—2 of Fig. 1 of the device shown in Fig. 1.

Referring now to the drawing, the submarine signaling device illustrated in Figs. 1 and 2 is adapted for use as either a supersonic compressional wave receiver or projector and comprises a generally cylindrical frame or foundation member 10, for example of metal, having annular inwardly and outwardly extending flanges 11 and 12, respectively. Fitted within the flange 11 and having a flange portion seated thereagainst is a compressional wave energy transmitting element 13, the face 14 of which is intended to be exposed to the sea. The element 13 may be a body of a material, such as a rubber or a thermoplastic, having substantially the same characteristics for the transmission of supersonic compressional wave energy as sea water. A particularly suitable material is a commercially available form of air-free rubber having substantially the same density and impedance to the transmission of compressional wave energy as sea water.

An annular transducer comprising a core 15 and a pair of coils 16 and 17 wound upon the core 15 encompasses and intimately engages the element 13 and is seated upon a resilient washer 18 in turn seated upon the flange 11. The transducer may be held in position longitudinally by a plate 19 affixed to the frame 10, as by screws 20, and having a cylindrical portion 21 bearing against a resilient, for example, rubber, washer 22 engaging the transducer. The core 15 is of a magnetostrictive material, for example nickel or an alloy composed of the order of 45 per cent nickel and the balance principally iron, and as illustrated may be wound of a plurality of turns of tape of this material, adjacent turns being insulated electrically from one another.

One of the coils 16 or 17 is energized by a suitable direct current source, not shown, to polarize the core 15 circumferentially at the flux density requisite for optimum magnetostrictive action. The other coil serves as a signal coil. When current is supplied to the signal coil, the flux threading the core 15 varies accordingly and, because of its magnetostrictive properties, the core increases and decreases in circumferential length proportionately to the amplitude and sign of the flux variations. Consequently, as will be apparent, the core vibrates radially in accordance with the signal currents. As a result of the radial vibrations of the core, the body or element 13 is subjected to varying radial forces corresponding in amplitude to the core vibrations and, consequently, is caused to vibrate axially, that is, in the directions normal to the radii of the core. Thus, radial vibrations of the core are converted into longitudinal vibrations of the body or element so that compressional waves corresponding to the currents supplied to the signal coil are radiated from the surface 14 of the element 13.

Conversely, compressional waves incident upon the surface 14 cause vibrations of the body or element 13 in the axial or longitudinal direction and these vibrations are converted into radial vibrations of the core 15. The vibrations of the core, because of the magnetostrictive character of the core, result in corresponding variations in the flux density in the core, whereby signal currents corresponding to the waves incident upon the surface 14 are induced in the signal coil.

The device may be adapted for either broad or narrow band reception or propagation of compressional wave signals. In either case, the mechanical parameters of the core advantageously are made such that, considering the loading on the core due to the coils 16 and 17 and the body or element 13, the fundamental mode of radial vibration of the core corresponds substantially to the mid-frequency in the band of frequencies the device is intended to translate. If the device is intended for narrow band operation, advantageously a backing member or resonator 23, which may be of metal and integral with the plate 19, is provided, the resonator 23 and element 13 being made of such length that in combination they constitute a half wavelength resonator at the mid-frequency on the operating band and having a vibrational node at substantially the plane midway between the end faces of the core. Similarly, a wide range of operating characteristics may be obtained through correlation of materials and by the optimum proportionment and disposition of the component elements of the device.

The device may be mounted within a suitable watertight housing, a portion of which is shown at 24 in Fig. 1, by way of a mounting ring 25 affixed to the housing and to which the flange 12 is secured, together with a sealing gasket 26, by a clamping ring 27.

It will be appreciated that all parts of the core contribute magnetostrictively to the conversion of sonic into electrical energy, or vice versa, so that high operating efficiencies are realized. Further, it will be appreciated that the device is of rugged, compact and relatively simple construction and is readily fabricable.

The power capacity and more particularly the power radiated per unit area of the surface 14 may be increased by utilizing two or more magnetostrictive elements or transducers spaced along the body 13 and each in intimate energy transferring relation therewith.

Although in the device illustrated in Fig. 1 the body 13 has been described as having its active face 14 in direct contact with the sea, the body may bear against a diaphragm or a wall of a housing through which energy is transmitted from the sea to the body or vice versa. In such construction, advantageously, means are provided for adjusting the force with which the body bears against the diaphragm or wall thereby to enable adjustment of the coupling between the magnetostrictive ring and the body for optimum operation.

The signal translating device illustrated in Fig. 3 is similar generally to that shown in Figs. 1 and 2 and described hereinabove, differing therefrom principally in the construction of the core and of the compressional wave energy transmitting element. As illustrated in Fig. 3, the core 115 is composed of a pileup of thin annuli of magnetostrictive material electrically insulated from one another, and the coils 16 and 17 are wound around the annuli. The core 115 is fitted in a hollow wave energy transmitting element 113 having a face 114 adapted to be exposed to the sea, the element 113 being of a material, such as a commercially available form of rubber, having substantially the same characteristics for the transmission of supersonic compressional wave energy as sea water. The hollow element 113 is filled completely as by way of a port closed by a plug 40 with an air-free liquid 29, such as castor oil, having similar wave energy transmission characteristics, and is provided with a flange 28 by which it is mounted in a housing 125 by the clamping ring 127.

As in the device illustrated in Figs. 1 and 2, in the device shown in Fig. 3, radial vibrations of the core 115 in response to signal currents supplied to the signal coil 16 or 17 are transformed into axial vibrations of the element 113 and of the body of liquid 29 therein, whereby compressional waves are radiated from the surface 114. Conversely, compressional waves incident upon the surface 114 are converted into radial vibrations of the core 115, whereby corresponding signal currents are reduced in the signal coil. Also, as in the device illustrated in Fig. 1, in the device shown in Fig. 3, the active face 114 of the body 113 may bear against a diaphragm or wall of a housing by way of which energy is transmitted from the body to the sea or vice versa.

In the embodiment of the invention illustrated in Fig. 4, a plurality of annular, magnetostrictive transducers 15, 16 and 17, similar to that included in the device shown in Fig. 1, are mounted coaxially upon and in intimate energy transferring coupling relation with a cylindrical, open-ended wave energy transmitting element 213 of a material, such as commercially available forms of rubber or plastics, having substantially the same characteristics for the transmission of compressional wave energy as sea water.

The element 213 is mounted within a housing 30, for example of metal, is restrained against longitudinal motion by end rings 31 and is engaged at spaced points by annular spacers 32, which are fitted in resilient annuli 33 in turn fitted within the housing 30, and serve as resonator rings and to prevent collapse of the element 213 by the water pressure acting upon the element 213 when the device is submerged in the sea. The leading-in conductors for the several coils 16 and 17 are connected to the respective conductors of a cable 34 extending through a hub 35 on the casing and affixed thereto by suitable clamps 36.

When the device illustrated in Fig. 4 is utilized as a projector, the radial vibrations of the cores 15 in response to signal currents supplied to the signal coils are transmitted to the element 213 and are converted into vibrations in the body of water within the element 213 in the direction of the axis of this element. Conversely, when the device is operated as a receiver of submarine signals, the compressional waves in the body of water encompassed by the element 213 are converted into radial vibrations of the several cores whereby corresponding currents are induced in the signal coils.

Various directional characteristics may be realized for a device of the general construction shown in Fig. 4 by correlation of the spacing of the cores and the electrical phasing of the signal coils, account being taken, of course, of the shielding effect of the housing 30. For example, if adjacent cores 15 are spaced center to center a distance substantially equal to one-half wavelength of the intended operating frequency of the device, or of the mid-frequency in the intended operating band of the device, and the output voltages of alternate coils are shifted 180 degrees in phase, the outputs of all the signal coils in combination will be a maximum for submarine signals emanating from a source aligned with the longitudinal axis of the element 213, and the device will exhibit a bidirectional characteristic. That is, it will have maximum response to compressional waves traveling in the direction substantially along the longitudinal axis noted, either from the left or from the right in Fig. 4. The device may be made unidirectional for such spacing of the cores and connection of the coils, by closing one end of the member 213 as by a non-reflecting cap or closure.

Figure 5:
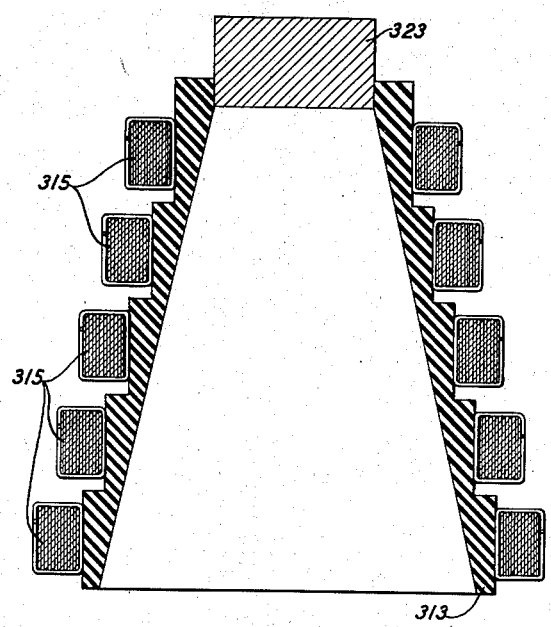
Fig. 5 is a fragmentary view in section of a multi-frequency device illustrative of another embodiment of this invention.

The invention may be embodied also in multi-frequency devices, that is, devices for projecting or receiving several discrete frequencies or bands of frequencies. One construction suitable for such use is illustrated in Fig. 5 and comprises a generally frusto-conical compressional wave energy transmitting body 313 having a stepped outer surface with which a plurality of annular magnetostrictive transducer units 315 are in intimate engagement. As shown in the drawing, the several units are of different diameters so that each unit is resonant at a frequency determined by the parameters thereof and, hence, is particularly efficient at that frequency. Of course, the several units may be constructed so that each is resonant at a different prescribed frequency in a specified band. For example, in a device of the construction shown, the several units may be constructed to be resonant at frequencies of 8, 16, 24, 30 and 36 kilocycles, respectively.

The several units may be connected selectively to a signal source or detector or each may be connected to a source or detector individual thereto, and the units may be operated individually or simultaneously both for projection and reception of compressional wave signals. As will be apparent, when utilized as a projector, the device enables the propagation of a plurality of discrete frequencies or bands of frequencies and, when utilized as a detector enables reception of such frequencies or bands and also enables determination of the frequency of signals from an unknown source.

Advantageously, the body has secured to one end thereof a backing member or resonator 323, for example of metal.

The device as illustrated may be enclosed in a suitable housing and the inner surface of the body 313 may be exposed directly to the sea. Longitudinal vibrations of the body of water within the body 313 are converted into radial vibrations of the magnetostrictive units 315, and vice versa, as in the devices described hereinabove.

Although specific embodiments of the invention have been shown and described, it will be appreciated that they are but illustrative and that various modifications may be made therein. For example, cores of stacked annular laminae, such as shown in Fig. 3, may be utilized in place of tape wound cores as illustrated in Figs. 1, 2 and 4. Also, for example, although the cores have been described as polarized by way of a winding separate from the signal coil, a single coil may be employed for both the polarizing and signal currents. Further, the core may be polarized by permanent magnets, for example by a bar magnet having its poles adjacent diametrically opposite regions of the core or by a substantially circular magnet encompassing the core and having its poles opposite closely adjacent regions of the core. In some cases, particularly where the core is of a material having high remanence, the residual flux may be utilized to bias or polarize the core. Other modifications may occur to those skilled in the art without departing from the scope and spirit of the invention as defined in the appended claims.

What is claimed is:

1. A magnetostrictive device comprising a substantially cylindrical longitudinally vibratile body and an annular, radially vibratile transducer element encompassing said body and in intimate energy transmitting relation therewith, said element comprising an annular magnetostrictive core mounted for substantially free radial vibration and a signal coil in electromagnetic coupling relation with said core.

2. A signaling device comprising a pliable compressional wave energy transmitting body, an annular, radially vibratile magnetostrictive core encompassing said body and in intimate energy transferring relation therewith, and a signal coil in electromagnetic coupling relation with said core.

3. A submarine signaling device comprising a cylindrical body having substantially the same characteristics as sea water for the transmission of compressional wave energy, and an annular, radially vibratile transducer element encompassing said body and in intimate engagement therewith, said element comprising an annular magnetostrictive core and a signal coil wound thereon.

4. A submarine signaling device comprising a body of rubber capable of efficiently transmitting compressional wave energy, said body having a cylindrical portion and an active face substantially normal to the longitudinal axis of said cylindrical portion, and an annular, radially vibratile transducer element encompassing said cylindrical portion and fitted thereon, said element comprising an annular magnetostrictive core and a signal coil wound thereabout.

5. A submarine signaling device comprising a hollow, substantially cylindrical body of compressional wave energy transmitting material, a substantially air-free liquid filling said body, said material and liquid having substantially the same characteristics for the transmission of compressional wave energy as sea water, and an annular, radially vibratile transducer element encompassing said body and fitted thereon, said element comprising an annular magnetostrictive core and a signal coil electromagnetically linked to said core.

6. A submarine signal device comprising an elongated cylindrical compressional wave energy transmitting element, and a plurality of radially vibratile transducer elements mounted in spaced relation along said transmitting element and each encompassing and in intimate vibration transmitting relation with said transmitting element, each of said transducer elements comprising an annular magnetostrictive core and a signal coil coupled thereto.

7. A submarine signaling device comprising an elongated, hollow, open ended cylindrical body having substantially the same characteristics as sea water for the transmission of compressional wave energy, and a plurality of radially vibratile transducer elements encompassing and in intimate engagement with said body, said elements being positioned in spaced relation along said body and each element comprising an annular magnetostrictive core and a signal coil applied thereto.

HUBERT K. KRANTZ.